United States Patent Office 3,050,243
Patented Aug. 21, 1962

3,050,243

DATA-TRANSMITTING AND PUNCHING MECHANISM

Rudolf Bothe, Manchester, N.H., assignor to Bothe Compütronics, Inc., Manchester, N.H., a corporation of New Hampshire Filed July 22, 1959, Ser. No. 828,758
3 Claims. (Cl. 234—103)

Figure 1:
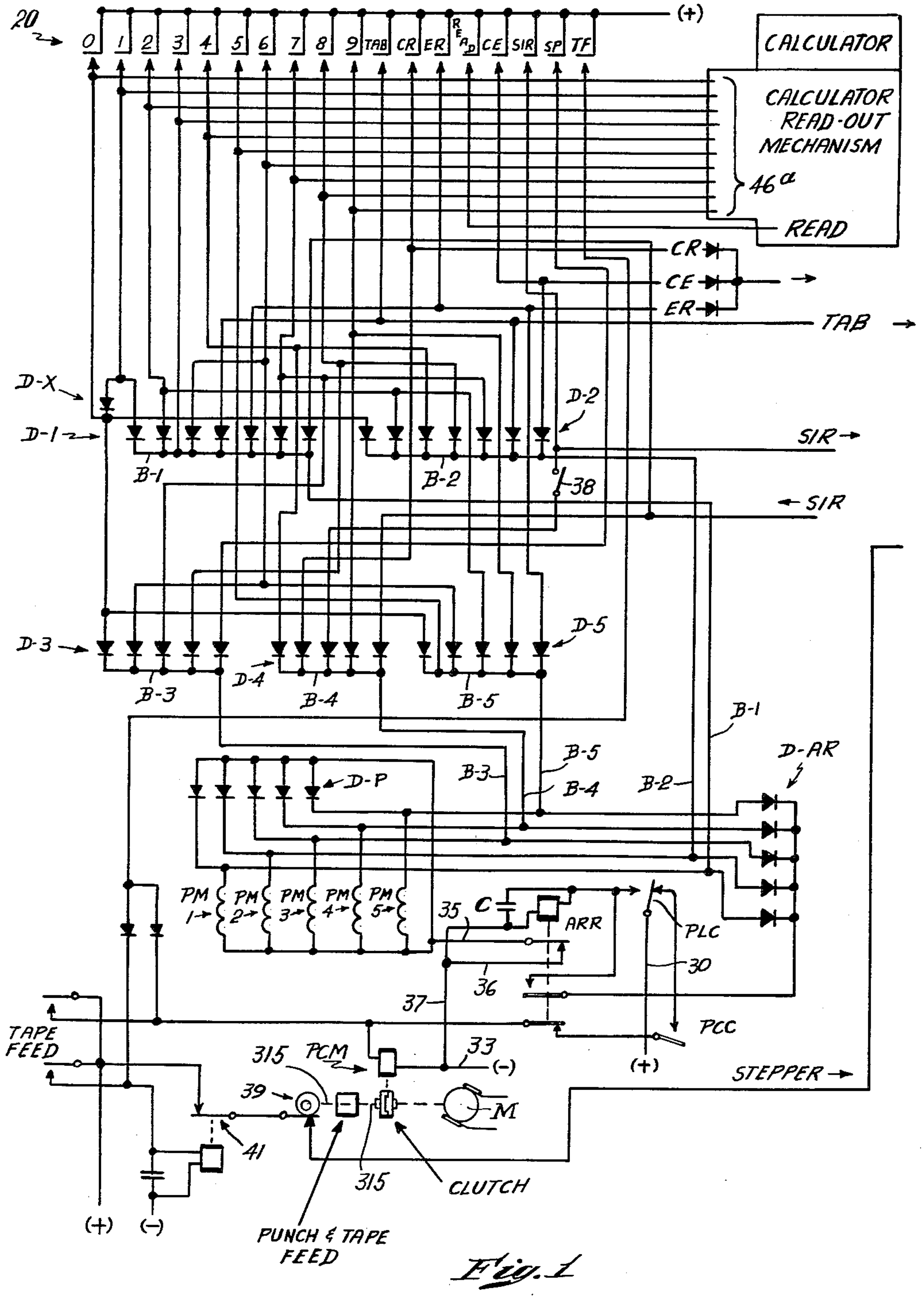

This invention relates to data-transmitting and punching apparatus in which electrical impulses which represent different characters are encoded to code channels, each of which channels controls a punch-controlling magnet. In such apparatus the number of code channels will be less than the number of different characters to be transmitted, an example being use of the standard five-channel tape punch code to transmit all ten digits.

In general the invention aims to provide an improved circuit in which the diodes of a diode matrix are protected against burning out, and in which a diode matrix is employed to establish an anti-repeat circuit preventing accidental repeated actuation of any of the punch controlling magnets by a given impulse unduly prolonged.

The United States patent to Bafour et al. No. 2,762,485 proposes to control code punches by means of solenoids which are connected in various combinations to keyboard switches, with rectifiers interposed between the several solenoids and switches to isolate the several circuits.

Rectifiers, having no moving parts, generally offer the advantage of permitting the channeling of an impulse directly to th eproper combination of code magnets or solenoids without the opening and closing of a considerable number of relay contacts. However, solid semi-conductor rectifiers, such as silicon diodes offer the additional advantage of permitting miniaturization enabling complex matrices, capable of handling a large number of different characters, to be incorporated inside of a business machine.

The difficulty in adapting these miniature silicon diodes to the control of magnets is that they tend to burn out in use and lose their blocking resistance. The failure of a diode in this environment is a serious matter because in most cases the error introduced in the punching would go unnoticed. For instance, in the standard five channel tape code "one" is represented by punching in the first, second, third and fifth channels and "two" is represented by punching in the first, second and fifth channels only. Thus in order to distinguish between "1" and "2" each of the first, second and fifth channels must be isolated from the third channel in such a way that the third channel will not be pulsed when, in transmitting "2," it is intended that only the first, second and fifth channels will be pulsed. If any of the diodes which are used for this isolation should burn out, each "2" would be punched as "1." The punching operation proceeds so fast that the operator would not detect the error.

My belief is that the burning out of the silicon diodes is caused by surge which occurs during the collapse of the field of the code magnet which has been actuated though the diode.

In any event I have effectively prevented the burning out by connecting across each code magnet another silicon diode arranged in a blocking direction to the impulse that actuates the magnet. This appears to provide a path through which the magnet can discharge when it acts as a generator during collapse of its field.

It might be supposed that use of this diode connected across the code magnet would slow down the punching operation. Diodes have been connected across the operating coils of relays for the purpose of causing delay in dropping out of the relay. However, there is available magnet-controlled punching equipment in which the length of time required for deenergization of the magnet is not critical, the magnet can remain energized through a considerable part of the cycle of punching and tape feed, and the magnet armature is mechanically restored irrespective of tendency to stick, so that in fact the cycle is not lengthened by the delaying action of the diode which is connected across the magnet.

Fortunately a diode connected across a magnet does not introduce any delay in the energization of the magnet, so response of the magnet to the impulse is immediate.

Preferably an automatic switch is provided for interrupting the impulse through the code magnet or magnets at a point in the cycle and means is provided tending to restore this automatic switch in the latter part of the cycle, but a circuit is provided for preventing this restoration and for holding the switch open until the pulse-transmitting switch (a keyboard switch or read-out switch) has opened. This is accomplished by a holding circuit for the automatic switch including connections from the several output channels of the diode matrix with further diodes in these connections in a direction to block cross-activation of one output channel by another output channel through these connections to the holding circuit.

Other objects and advantages of the invention will appear from the following specification in which the invention is explained by reference to the drawings.

Figure 2:
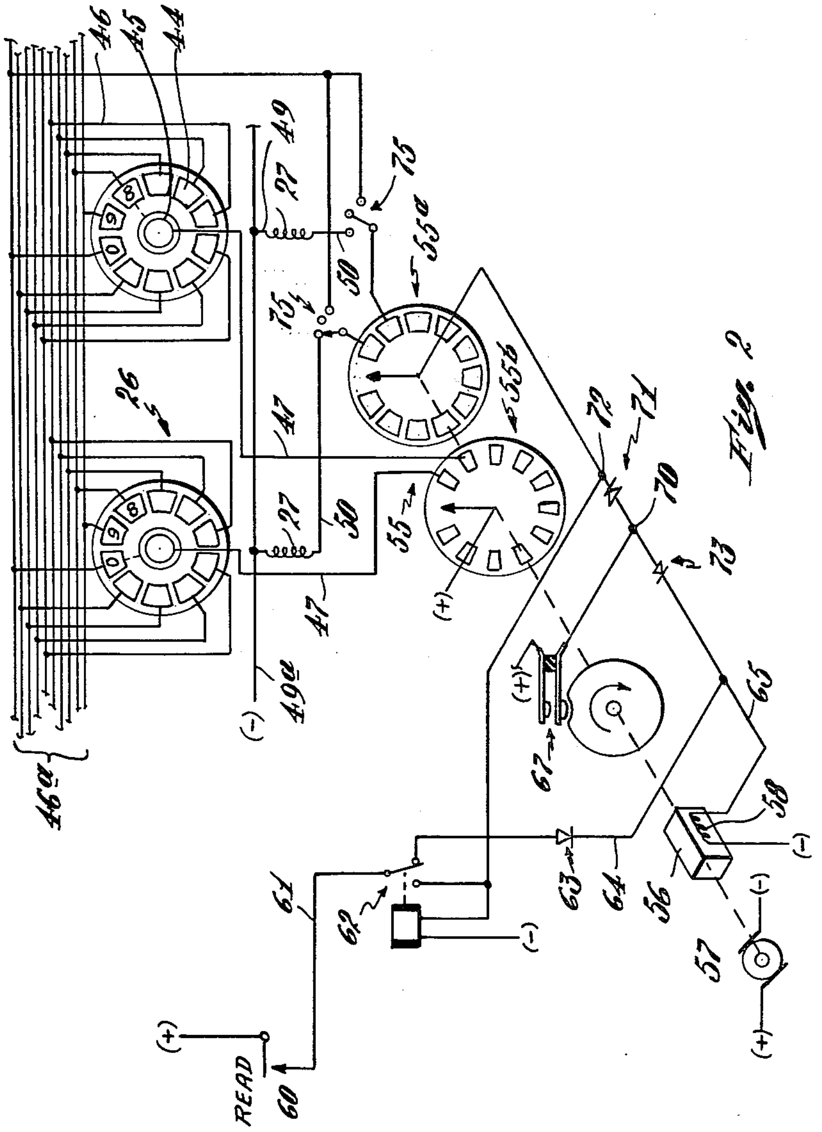

In the accompanying drawings,

FIG. 1 is a schematic diagram showing the application of the present invention to a calculator having read-out mechanism and auxiliary keyboard mechanism, either of which mechanisms can control the punching of data in code; and FIG. 2 is a schematic diagram of read-out mechanism suitable for use with the circuit of FIG. 1.

The invention preferably is applied to a calculator whose number wheels are equipped with the read-out mechanism of my application for United States patent for Read-Out Mechanism for Calculators, Serial No. 828,757, filed July 22, 1959.

Thus in FIGS. 1 and 2 there may be seen the ten busses **46*a* of my other said application, which lead from the segment contacts on the non-rotating elements 26** of the eleven rotary read-out switches that are located within the eleven number wheels, only two of these read-out switches being shown.

Each switch is capable of transmitting a pulse through the bus which corresponds to the angular position of the number wheel. A contact member carried by the number wheel can bridge across from a central ring contact 45 to the appropriate segment 44, establishing a circuit. Dotted lines diagrammatically show the left read-out switch of FIG. 2 so bridged at the zero position of the number wheel and the right read-out switch so bridged at the 8 position. My said other patent application may be referred to for a more detailed disclosure of the read-out switches.

The several read-out switches are preferably closed by energizing coils 27 which are associated therewith as disclosed in my other said application. FIG. 2 shows the preferred circuit for pulsing the several coils 27 in succession.

A distributor switch having decks **55*a* and 55*b* is adapted to send pulses to the eleven switch actuating coils 27 and to send pulses to the central ring contact 45** of each switch.

The conductors 47 from the central ring contacts extend to contacts of deck **55*b* of switch 55, only two of these conductors being shown in FIG. 2. Deck 55*b*** serves to supply pulses to the several read-out units, for transmission to the punch controlling matrix.

Each contact of deck **55*b*, though aligned at its center with the center of a corresponding contact of deck 55*a*, has only about one-half the angular extent of the corresponding contact of deck 55a. Thus the pulse to the central ring contact 45 commences only after the read-out switch is closed by means of coil 27** and ends before the read-out switch is opened. There is accordingly no possibility of arcing within the number wheel.

The distributor switch is shown as mechanically driven by clutch 56 which in turn is driven by a motor 57. Clutch 56 is of the type which is normally disengaged, but becomes engaged by energization of a solenoid 58. This energization is initially caused by manually closing a "read" key switch 60 which establishes a circuit through conductor 61, and automatic switch 62 in its normal right-hand position, a diode 63 and conductors 64 and 65.

The clutch is thereupon engaged and the distributor switch 55 begins to rotate.

A cam switch 67 which rotates with the distributor switch 55 is closed as soon as this rotation begins, establishing a circuit from (+) to junction 70 and through diode 71 to junction 72.

From junction 72 one branch circuit extends to the wiper member of deck 55a of the distributor switch 55 to supply the pulses to the coils 27 and another branch circuit extends to the actuating coil of automatic switch 62, to render the "read" key switch ineffective to prolong energization of the clutch solenoid 58.

From junction 70 another circuit extends through diode 73 and conductor 65 to the clutch actuating coil 58.

The above circuits from junctions 70 and 72 are maintained through one revolution of the cam switch and distributor switch, whereupon they are interrupted by opening of the cam switch. The clutch coil thereupon is deenergized and the distributor switch stops in its home position.

It will be seen that the circuit established by closure of the cam switch 67 insures that the distributor switch will make one full revolution although the "read" key switch is released before the read-out cycle is complete.

Moreover, if the "read" key switch is held closed throughout the full revolution of the distributor switch, the distributor switch will not make a second revolution until the "read" key switch is opened and again closed. The actuating coil of automatic switch 62 is energized and this switch is in its left position until the end of the revolution. In this position the clutch solenoid cannot be energized via the "read" key switch. If at the time the cam switch 67 opens at the end of the revolution the "read" key switch is still closed, then the circuit through conductor 61, the left contact of switch 62 and the operating coil of switch 62 will retain the switch 62 in its left position, preventing a further cycle of reading until the read key switch is opened and again closed.

Manual switches 75 are preferably interposed between the distributor switch 53 and the read-out coils 27. By opening a selected switch or switches 75 the reading out can be confined to any one or more number wheels. This is advantageous in condensing the punching when the calculator is dealing only with a few columns of significant figures. As indicated in the diagram each switch 75 has two alternate closed positions. One closed position enables the corresponding coil 27 to be energized in normal reading out. The other alternate closed position diverts the pulse to the zero bus of the group of busses 46a. This latter arrangement permits omitting the reading out from any particular column of the calculator and automatically substituting a zero in the place of the unread numeral.

The calculator is preferably provided with an auxiliary keyboard indicated generally at 20 including normally open key switches corresponding to the digits 0 to 9, connected on one side to a (+) potential and on the other side to the busses 46a and the diode matrix to be described. The auxiliary keyboard enables data to be transmitted manually into the same matrix and punch control mechanism which is controlled by the read-out mechanism of the calculator.

The auxiliary keyboard may also include various "function" keys which permit signals other than the simple digits to be transmitted into the matrix, encoded, and punched. Preferably the "read" key 60 is incorporated in the auxiliary keyboard.

Thus, conductors from the auxiliary keyboard and from the read-out mechanism constitute the inlet channels of the diode matrix. The matrix includes five groups of silicon diodes, indicated at D–1 to D–5 respectively, these five groups corresponding to the five channels of the standard five-channel code. Examination of the illustrated matrix will show that in most cases the circuits from busses 46a and the keys of keyboard 20 branch and extend to diodes of more than one group. For example the circuit from the 0 inlet channel branches and extends to diodes of the 2, 3 and 5 groups.

The matrix diodes of the respective groups are connected on their negative sides to respective busses B–1, B–2, B–3, B–4 and B–5 which extend to the five punch-controlling code magnets PM–1 to PM–5.

It was mentioned that in most cases the circuits branch and extend to diodes in more than one group. In these cases the closure of an auxiliary keyboard switch or the reading out of a digit of a number wheel actuates more than one punch magnet.

The circuits to the magnets need not all branch however. It will be seen that the circuit from the three-key and three-bus of the busses 46a extends directly to the bus B–1 for the first group of diodes, without branching, actuates only the PM–1 magnet, and does this without passing through a diode.

In FIG. 1 the matrix diode D–X has been set apart from the five groups of diodes D–1 to D–5 since the diodes of these five groups each afford entry to a single output channel whereas this other diode D–X affords entry to the group of output channels 2, 3 and 5. This diode D–X permits a single diode of group 2, a single diode of group 3 and a single diode of group 5 to participate in punching both 0 and 1, thus saving two diodes. This diode D–X may be regarded as a means effective to prevent energization of the group 1 bus by a pulse representing 0.

The tape punching equipment is mechanically like that disclosed in United States Patent No. 2,700,446, particularly shown in FIG. 35 thereof, but with only five punch magnets PM–1, PM–2 etc. instead of the six magnets of that patent. Although the electrical connections of the present device differ from those of No. 2,700,446, the present device utilizes the switches indicated at PCC and PLC, the relay indicated at ARR and the punch clutch magnet indicated at PCM in that patent.

As in No. 2,700,466, when any punch magnet PM–1, etc. becomes energized and its armature rises a corresponding punch lever latch is thereby tripped, a punch lever is released by the latch and the release of any one or more of these levers closes the normally open switch PCC.

In the present circuit the movable member of switch PLC is connected to positive by a conductor 30. Closure of switch PCC then completes a circuit through the lower contact of ARR, the punch clutch magnet PCM and conductor 33 to negative ground.

Energization of PCM institutes a cycle of operation of the tape punching and feeding device of said Patent No. 2,700,446. The PCM causes a normally stationary shaft 315 of the patent (indicated by the same reference character in FIG. 1 of this application) to be driven through one revolution during which one line is punched in code, the tape is advanced one step, the active punch lever or levers is or are restored and latched and the armature or armatures that have been attracted by the punch magnet or magnets is or are mechanically forced away from their corresponding magnet if there is tendency of the armature to stick.

During this cycle switch PLC is automatically moved from its normal position to its opposite position and back to its normal position as in No. 2,700,446. (It may be noted that in the present diagram the normal position of PLC is to the right as shown, instead of to the left as shown in the wiring diagram of No. 2,700,446.)

In the present diagram the magnets are shown as connected by a conductor 35 to the upper contact of ARR, which when closed establishes a path through conductors 36, 37 and 33 to negative ground. As in said Patent No. 2,700,446 movement of PLC away from its normal position energizes the coil of ARR, which by opening the upper contact of ARR interrupts the punch magnet circuits.

By opening of the lower contact of ARR the circuit through the punch clutch magnet PCM is interrupted.

Either the above mentioned opening of the upper contact of ARR or opening of the pulse circuit at deck **55*b*** at the distributor switch will ordinarily terminate the pulse before the cycle of the punching is complete.

The distributor switch must of course turn at no faster rate than the punching equipment can accommodate. The distributor switch will therefore normally be driven at a rate which starts the pulses at intervals slightly longer than the cycle of operation of the punching equipment.

A capacitor C, connected across the coil of ARR delays the drop out of ARR and the pulse circuit will normally be open at the distributor switch when ARR drops out near the end of the punching cycle.

However, in operation of the auxiliary keyboard, there is no assurance that the operator will time her operations of the keys to fit the punching cycle, i.e., she may well hold a key depressed longer than the duration of a punching cycle. Provision is therefore made to prevent repeated cycles of punching caused by prolonged depression of a key.

In Patent No. 2,700,446 there is a holding circuit for ARR, this holding circuit comprising PLC in its normal position, a mechanically operated switch designated as SCC indicated in FIGS. 29 and 51 of that patent, and the upper contact of ARR.

In the patent the translation into code is accomplished mechanically, and the data only transmitted electrically after being encoded. Slides corresponding to the respective symbols are provided with differently formed cams so that the slides operate switch-closing bails in different combinations. One bail, however, is operated by all of the slides and serves to keep SCC closed when any slide is active. The holding circuit is maintained as long as SCC remains closed, so that a new cycle cannot be begun until SCC has opened.

There are no such elements as SCC and its operating means in the present equipment. It is considered advantageous that the coding is performed electrically so that closure of a single key of the keyboard 20 will directly institute a pulse in code, without interposition of any mechanical coding device. In the equipment of the present application a holding circuit is established via the code matrix, so that so long as any of the five code matrix busses B–1, B–2 etc. remain energized a second cycle of punching cannot be performed.

Each matrix bus B–1, B–2 etc. is connected through a diode D–AR to a conductor extending to the middle contact of ARR which when closed provides a holding circuit for ARR. The several diodes D–AR prevent any of the matrix busses from being energized by energization of any other matrix bus through the connection of all of these busses to the ARR contact.

Connected across each of the punch magnets PM is one diode D–P of a group of five diodes D–P which serves to protect all of the diodes of the corresponding code diode group against burning out. These protective diodes D–P are arranged in a blocking direction with respect to the pulses by which the punch magnets are operated. The theory of operation according to which these protective diodes function is not altogether clear. It may be surmised that they retard the collapse of the fields of the magnets and hence reduce the intensity of the surge that accompanies this collapse. Although the period during which the magnet is in an energized condition is doubtless prolonged by these protective diodes, there is sufficient time after the circuit has been broken by the ARR to permit of this delayed collapse of field during the remaining part of the punch cycle.

The matrix may be employed in conjunction with control equipment responsive to pulses from the apparatus of this application. The function keys CR, CE, ER, SIR and TAB are adapted to send pulses to such control equipment as well as to operate the herein described punching equipment. Arrows indicate the paths of pulses from these function keys, the pulses from CR, CE and ER being led into a common channel through diodes.

The matrix is also adapted to receive pulses from such control equipment. This is exemplified by an incoming SIR connection which leads to busses B–1 and B–4, preferably through its own individual diodes, for causing the punching of the second line of the standard SIR signal.

The matrix may be provided with manual switches to disable any of the code circuits. This is exemplified by a switch 38 adapted to interrupt the connection between the SIR key and a group 4 diode.

The control equipment may be timed by the punch. Thus the intermittently operated shaft of the punch may operate a cam switch 39 to send a pulse to the "stepper" of the control equipment.

Energization of the clutch magnet PCM without energization of any of the punch magnets PM will cause feed of the tape without punching. This may be accomplished by closing a tape feed switch at the punching equipment, which may be remote from the keyboard, or by depressing a keyboard key TF, either of which will apply (+) to the PCM independently of the matrix as may be seen from FIG. 1. In either case the pulse to the stepper is suppressed, when there is tape feed without punching, by opening of an automatic switch 41 which responds to closure of either the tape feed switch or the tape feed key.

I claim:

1. In combination with a multiple-channel code punching apparatus of the type in which the punching in the several channels is controlled by respective magnets, a matrix including diodes, the matrix having input channels for receiving data-representative pulses and having output channels less in number than the input channels, said output channels being connected to said magnets to deliver pulses in code to said magnets, and means for protecting the diodes of the matrix, said means including further diodes connected across the magnets in a blocking direction with respect to said pulses.

2. In combination with a multiple-channel code punching apparatus of the type in which the punching in the several channels is controlled by respective magnets, a matrix including diodes, the matrix having input channels for receiving data-representative pulses and having output channels less in number than the input channels for delivering pulses in code to said magnets, an automatic switch adapted to terminate the pulses, and a holding circuit for the automatic switch including connections from the several output channels of the matrix to a common point and further diodes in said connections in a direction to block cross activation of one output channel by another output channel through said connections, thereby to prevent repeated punching from resulting from overlong prolongation of a pulse.

3. In combination with a multiple-channel code punching apparatus of the type in which the punching in the several channels is controlled by respective magnets, a matrix including diodes, the matrix having input channels for receiving data-representative pulses and having output channels less in number than the input channels, said output channels being connected to said magnets to deliver pulses in code to said magnets, and means for protecting the diodes of the matrix, said means including further diodes connected to the respective output channels in parallel with the magnets and in a blocking direction with respect to said pulses.

References Cited in the file of this patent

UNITED STATES PATENTS

| | | |
|---|---|---|
| 2,737,241 | Doty | Mar. 6, 1956 |
| 2,858,888 | McGayhey et al. | Nov. 4, 1958 |
| 2,902,092 | Hildebrandt | Sept. 1, 1959 |